United States Patent
Lutz et al.

(10) Patent No.: US 11,934,507 B2
(45) Date of Patent: Mar. 19, 2024

(54) PROJECT-ORIENTED CERTIFICATE MANAGEMENT

(71) Applicant: Siemens Aktiengesellschaft, Munich (DE)

(72) Inventors: Benjamin Lutz, Pfinztal (DE); Anna Palmin, Karlsruhe (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 826 days.

(21) Appl. No.: 16/978,234

(22) PCT Filed: Mar. 7, 2019

(86) PCT No.: PCT/EP2019/055763
§ 371 (c)(1),
(2) Date: Sep. 4, 2020

(87) PCT Pub. No.: WO2019/170829
PCT Pub. Date: Sep. 12, 2019

(65) Prior Publication Data
US 2020/0410080 A1    Dec. 31, 2020

(30) Foreign Application Priority Data

Mar. 9, 2018    (EP) .................... 18160968

(51) Int. Cl.
*G06F 21/33* (2013.01)
*G06F 21/44* (2013.01)
(Continued)

(52) U.S. Cl.
CPC ............ *G06F 21/33* (2013.01); *G06F 21/445* (2013.01); *G06Q 10/103* (2013.01);
(Continued)

(58) Field of Classification Search
CPC ..... G06F 21/33; G06F 21/445; H04L 9/3265; H04L 67/02; H04L 69/322; G06Q 30/0185; G06Q 10/103
See application file for complete search history.

(56) References Cited

U.S. PATENT DOCUMENTS

| 2006/0136748 A1* | 6/2006 | Bade ..................... H04L 9/3273 |
| | | 713/193 |
| 2007/0226693 A1* | 9/2007 | Chatlain ............ G06Q 30/0185 |
| | | 717/126 |
| 2011/0197061 A1 | 8/2011 | Chou et al. |

FOREIGN PATENT DOCUMENTS

WO    2011019898    2/2011

OTHER PUBLICATIONS

"The CIC Critical Security Controls Explained—Control 2: Inventory and Control of Software Assets"—Caspian Kilkelly, Rapid 7, Feb. 23, 2017 https://www.rapid7.com/blog/post/2017/02/23/the-cis-critical-controls-explained-control-2-inventory-of-authorized-and-unauthorized-software/ (Year: 2017).*

(Continued)

*Primary Examiner* — Randy A Scott
(74) *Attorney, Agent, or Firm* — Cozen O'Connor (57) ABSTRACT

A method for project-oriented authentication of a device in a control system for a technical installation as part of an engineering project, wherein the control system includes at least one local registration service, at least one software inventory and a certification center, where information by the at least one local registration service with respect to what communication protocols and/or applications are supported by the device and/or are active is ascertained during authentication of the device within the control system, a project-oriented device certificate is requested from the first hierarchy of the certification center by the local registration service, and the project-oriented device certificate is depos- (Continued)

ited in an inventory element, associated with the engineering project, of the software inventory of the control system, the device certificates being issuable by the first hierarchy of the certification center have a unique project identifier.

4 Claims, 3 Drawing Sheets

(51) Int. Cl.
*G06Q 10/10* (2023.01)
*G06Q 30/00* (2023.01)
*G06Q 30/018* (2023.01)
*H04L 9/32* (2006.01)
*H04L 29/08* (2006.01)
*H04L 69/322* (2022.01)
*H04L 67/02* (2022.01)

(52) U.S. Cl.
CPC ....... *G06Q 30/0185* (2013.01); *H04L 9/3265* (2013.01); *H04L 69/322* (2013.01); *H04L 67/02* (2013.01)

(56) References Cited

OTHER PUBLICATIONS

"Open Development Device Certification Process"—Verizon, Mar. 2017 https://opendevelopment.verizonwireless.com/content/dam/opendevelopment/pdf/OD_Device_Certification_Process.pdf (Year: 2017).*

PCT International Search Report dated Apr. 26, 2019 based on PCT/EP2019/055763 filed Mar. 7, 2019.

* cited by examiner

PROJECT-ORIENTED CERTIFICATE MANAGEMENT

CROSS-REFERENCE TO RELATED APPLICATIONS

This is a U.S. national stage of application No. PCT/EP2019/055763 filed 7 Mar. 2019. Priority is claimed on European Application No. 18160968.6 filed 9 Mar. 2018, the content of which is incorporated herein by reference in its entirety.

BACKGROUND OF THE INVENTION

1. Field of the Invention

The invention relates to a control system for a technical installation, methods for authenticating devices in the control system and to a use of the control system for operating the technical installation.

2. Description of the Related Art

In the context of an industrial, technical installation, what are known as operational certificates are used at runtime. By using the operational certificates, an authentication and the communication integrity of communication partners in a control system of the industrial, technical installation can be achieved cryptographically.

In this context, a private key securely stored in a device is linked to an associated public key. Here, automated support of the processes for administration of the operational certificates and the cryptographic keys associated therewith in the context of a public key infrastructure (PKI), particularly as a basis for a secure communication between applications and devices within the technical installation, is increasingly gaining importance.

With a reduction of manual actions in the framework of the certificate administration and increasingly automated processes based on standard protocols, particularly for rolling out and renewing certificates, it is possible to increase flexibility and interoperability in the context of the industrial installation.

Conventionally, the automated administration of operational certificates in the context of the installation is realized through the use of a standard protocol, such as the certificate management protocol (CMP). Here, the devices and applications request the necessary operational certificates situationally from what is known as a local registration authority (LRA). This occurs, for example, in the case of a renewal, which is required as a result of an expiration or a recall of the certificate.

Here, the devices and applications send a query to the local registration authority, i.e., the certificate signing request (CSR). The local registration authority checks the request by initially reviewing the validity of the signature used to sign the request. Subsequently, it checks whether a device certificate, a serial number and optionally further identification features of the devices or the applications is/are stored in what is known as a software inventory of the control system of the technical installation. In the event of a successful check, the request is forwarded to what is known as the certification authority (CA) or certification entity, which issues an operational certificate for the device or the application.

If a device certificate for a device is stored in the control system and the device is identified as trustworthy, then in the current prior art the device can be used within any given engineering project to the fullest extent which it is due in accordance with its certificate stored in the control system. An engineering project is understood in the present context to be an automation task for a part of an industrial installation (or for the entire installation). Such tasks may involve the steps "monitor, operate, or modify", for example.

If, in the context of a project, for example, a valid web server certificate issued by a trustworthy certification entity of an industrial installation is linked to the web server of an automation AS1, then this certificate can be used for the successful setup of a connection, initiated by a user in the context of a project 2, to the diagnostic buffer using Hypertext Transfer Protocol Secure (HTTPS). Here, the web server certificate has been issued by a certification entity of the industrial installation that is considered trustworthy throughout the installation and across projects. As a result, the web server certificate is successfully used in the authentication step initiated by the connection setup as standard. This means: the web server of the AS1 authenticates itself against the web client, which in this case is represented by the user/web browser in the context of the project 2, based on the certificate and the associated certificate chain that is valid throughout the installation and across projects. This is made possible by the client being able to successfully validate the web server certificate, because all data required for the validation of the certificate is available to it (as with all other installation users and devices).

As a result, access to the web server of the AS1 is made possible, even if, in the context of the project 2, this access is not provided, is not desired and in principle is to be avoided.

Also in the context of the communication protocol Open Platform Communications Unified Architecture (OPC UA), due to the fact that a OPC UA server of the AS1 possesses a valid server certificate relevant in the context of the project 1, there is the risk of an OPC UA client (which is not approved for this in the project 2) successfully establishing a certificate-based connection to the OPC UA server of the automation AS1.

US 2006/0136748 A1 discloses a data processing system for data storage via cryptographic methods.

US 2007/0226693 A1 discloses a method for preparing a certification project plan for certification of a project of a mobile platform via predefined rules.

WO 2011/019898 A1 discloses a method for granting certificates in the context of a private-public key network.

SUMMARY OF THE INVENTION

It is an object of the invention to create operational certificates provided for an exclusive use in the context of a particular engineering project, and an associated infrastructure of a control system for an industrial installation, such that the operational certificates can only be validated in the context of previously determined further engineering projects.

This and other objects and advantages are achieved in accordance with the invention by a control system for a technical installation, a method for the authentication of devices in the control system and by a use of the control system for operating the technical installation, where the control system in accordance with the invention for the technical installation of the type described in the introduction comprises a local registration authority, which is configured to authenticate devices in the control system, a software inventory, which is configured to store information relating to the authentication of the devices, and a certification authority for issuing certificates for the devices.

The control system in accordance with the invention includes software inventory that has a plurality of subinventories, in which mutually independent information relating to the authentication of the devices of a particular engineering project can each be stored on a project-related basis, the local registration authority is configured to register a device on a project-related basis and store the device in a project-related subinventory of the software inventory assigned to the respective engineering project, and the certification authority is configured on a project-related basis and has two hierarchies, where a first hierarchy is formed and provided to issue project-related device certificates for the devices, and where a second hierarchy is formed and provided to issue project-related operational certificates for the devices. In this context, the device certificates, which can be issued by the first hierarchy of the certification authority, have a unique project ID.

With the disclosed embodiments of the control system in accordance with the invention, it becomes possible to create operational certificates provided for an exclusive use in the context of a particular engineering project such that they are cannot be validated in the context of any further engineering projects, or can only be validated in further engineering projects determined in advance. An engineering project is understood in this context to be an automation task for a part of an industrial installation (or for the whole installation). Such tasks may involve the steps "monitor, operate or modify", for example. The operational certificates, however, furthermore may be issued in accordance with the X.509 standard (also known as International Organization for Standardization/International Electrotechnical Commission (ISO/IEC) 9594-8).

In this context, a project-related embodiment of the certification authority means that the certification authority is configured to act as a standalone certification authority for each engineering project. In the event of a certification authority used in the context of a particular engineering project becoming compromised, the certification authority (still related to other engineering projects) of the control system may continue to be considered trustworthy in the context of the other engineering projects. The associated engineering projects are therefore not affected by the compromising.

By way of example, in the case of a plurality of modular industrial installations working collectively, a dedicated engineering project may be configured by each installation. In this context, all these installations have been configured separately (if necessary, also with different engineering systems). For the collective cooperation, some devices are used by multiple projects. In one hypothetical case, an automation AS1 is configured in a first project P1 of the modular installation A1, where it automates a process-engineering process. For the collective cooperation, some process data of the automation AS1 is used for operating and monitoring in a second engineering project P2, for example, in the engineering project P2 there are system images which are made dynamic by the automation AS1. Dedicated accesses to the automation AS1 from the project P2 are necessary for this purpose.

With the control system in accordance with the disclosed embodiments of the invention, the configuration, maintenance and servicing (system messages) to be realized in the context of the engineering project P1 can be regulated by the corresponding operational device certificates related to the engineering project P1 (i.e., "exclusive to engineering project P1"). The same would apply for a "detailed operating and monitoring", e.g., for adjustment of controller parameters. A "simple operating and monitoring", for example, should also be possible together with another installation from another project, for this purpose, the control system in this example has issued the operational device certificates related to the engineering project P2 (i.e. "exclusive to engineering project 2").

With the inventive embodiments of the control system, an accidental or deliberate misuse of operational certificates in the context of a "false" engineering project can be effectively prevented.

The control system in accordance with disclosed embodiments of the invention enable linking in a flexible manner with state-of-the-art CA (certification authority) products and supports, due to the possible use of standard protocols for the certificate management, all conventional certificate management use cases (in particular bootstrapping, updating, revocation, hardware exchange). Thus, the control system conforms with the PKI (Public Key Infrastructure)-relevant requirements of the IEC62443 standard as the leading international security standard for industrial automation.

The control system in accordance with disclosed embodiments of the invention additionally enable a renewal of operational certificates and a device replacement, supported by the certificates, at runtime of an industrial installation, without an impact on the installation and the subsequent restarting of the software inventory and the certification authority. This makes a significant contribution to the availability of the installation.

With the project ID, the control system is configured to simply identify in the context of which engineering project a query to the certification authority is being made.

By way of example, it is assumed that, out of various engineering projects, operational certificates are requested from the certification authority by the local registration authority for one and the same automation device. Here, the operational certificates are identified by a unique project ID, such that an automation device can offer or decline services on a project-specific basis.

Should an installation component, e.g., the automation AS (part of a package unit), be used in engineering projects P3 and P4, then the installation component is stored in the associated subinventories of the software inventory. The installation component subsequently obtains project-specific operational certificates in the context of the registration. With the project-specific operational certificates, for example, it is possible to regulate that the engineering project P3 is permitted to operate and monitor in relation to the automation AS and the engineering project P4 is only permitted to operate (monitoring)

If a device (e.g., a server) from the context of the engineering project P4 now logs on at the automation AS, then the project ID is also handed over during the authentication, such that as a consequence it is possible to hand over the project-specific operational certificate for the encrypted communication. As a result, a pronounced distinction between the projects is enabled, and any misuse of the certificates granted in the context of an engineering project or communication relationships in the context of the other engineering project are excluded.

In an advantageous embodiment of the control system, the control system also comprises at least one process data archive, where the software inventory is integrated in the process data archive. The process data archive is also referred to as process historian. The process data archive is particularly well-suited as a data source within the control system, as it is designed with high-availability.

Preferably, the control system additionally has at least one engineering component and/or at least one operator system, what is known as an operator station (OS). The operator system may be a SIMATIC PCS 7 industrial workstation, without being restricted to this particular configuration. Here, the local registration authority is integrated in the engineering component and/or the operator system or the server associated with the operator system. It is therefore not necessary to use additional (hardware) components for the implementation of the local registration authority. Rather, the local registration authority may be integrated into an available architecture of a control system of a technical installation. Therefore, no additional hardware is required, which keeps the investment volumes low for an improved control system of this kind.

Advantageously, information relating to the configuration of the control system and/or the technical installation operated by the control system is stored in the software inventory of the control system. Here, the information may be read out from an engineering component, what is known as an engineering station (ES), of the control system. The engineering component may be a SIMATIC PCS 7 industrial workstation, without being restricted to this particular configuration. Changes to the configuration of the control system are advantageously immediately mapped in the software inventory at runtime of the technical installation.

In an advantageous embodiment of the control system in accordance with the invention, each of the two hierarchies of the certification authority comprises a root certification authority and an issuing certification authority. This enables the issuance of the certificates to be established in a particularly simple and secure manner.

It is also an object of he invention to provide a method for project-related authentication of a device in a control system for a technical installation in the context of an engineering project, where the control system has at least one local registration authority, at least one software inventory and one certification authority. The method comprises a) in the context of an authentication of the device within the control system, establishing information via the at least one local registration authority to determine which communication protocols and/or applications are supported by the device and/or are active;
b) requesting a project-related device certificate at the first hierarchy of the certification authority via the at least one local registration authority;
c) storing the project-related device certificate in a subinventory of the software inventory of the control system assigned to the engineering project;
d) requesting a project-related operational certificate via a device at the at least one local registration authority;
e) checking, via the at least one local registration authority, whether a corresponding project-related device certificate is stored in a subinventory of the software inventory of the control system assigned to the engineering project for the device making the request in the context of the engineering project in which the device is making the request;
f) requesting a project-related operational certificate at the first hierarchy of the certification authority via the at least one local registration authority; and
g) forwarding the project-related operational certificate to the device.

In the context of a preferred use, the control system may be used to operate a technical installation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which these are achieved will now become clearer and more intelligible in conjunction with the following description of the exemplary embodiment, which will be explained in detail making reference to the drawings, in which.

DETAILED DESCRIPTION OF THE EXEMPLARY EMBODIMENTS

Figure 1:
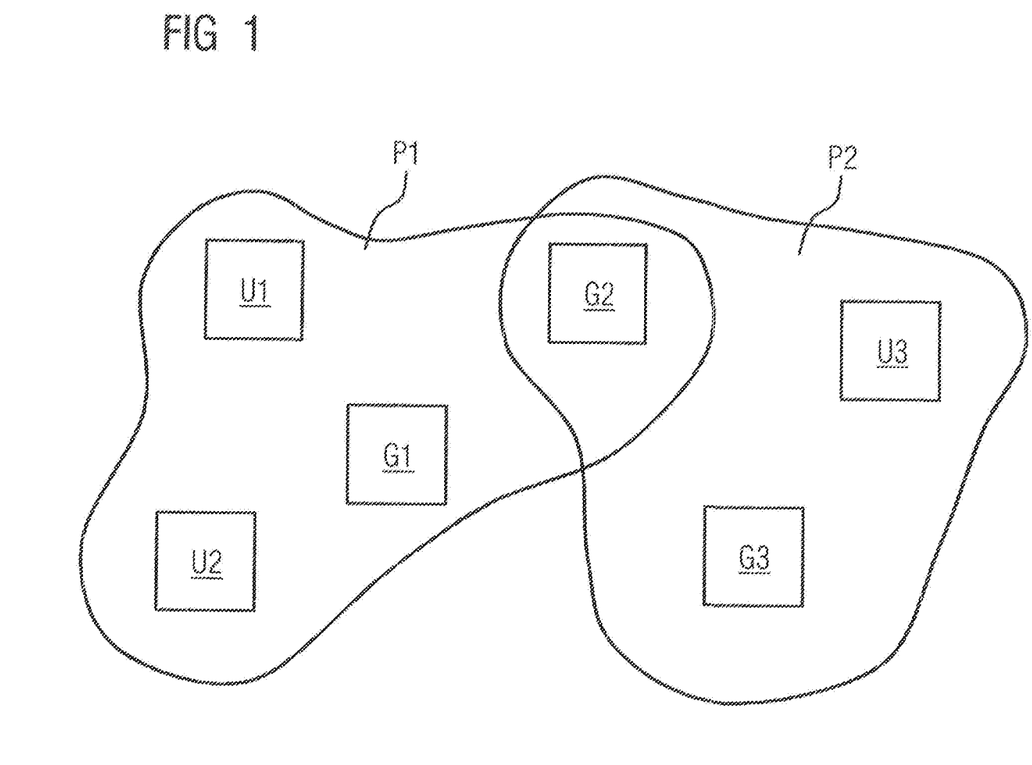
FIG. 1 shows a schematic of project-dependent permissions for users and devices within a control system.

Schematically illustrated in FIG. 1 are usage rights or access rights of individual users U1, U2, U3 and devices G1, G2, G3 within a control system 1 (not shown).

In the context of a first engineering project P1, two users U1, U2 and two devices G1, G2 are approved. Here, an engineering project is understood to be an automation task for a part of an industrial installation (or for the whole installation). Such tasks may involve the steps "monitor, operate or modify", for example.

In the context of a second engineering project P2, only a third user U3 and two devices G2, G3 are approved. As shown by the example of the device G3, users or devices may also be approved in multiple engineering projects P1, P2.

In this context, the invention ensures that a user or a device that has successfully authenticated itself against the control system 1 within an engineering project P1, P2 does not automatically also possess corresponding permissions in the context of another engineering project P1, P2.

Figure 2:
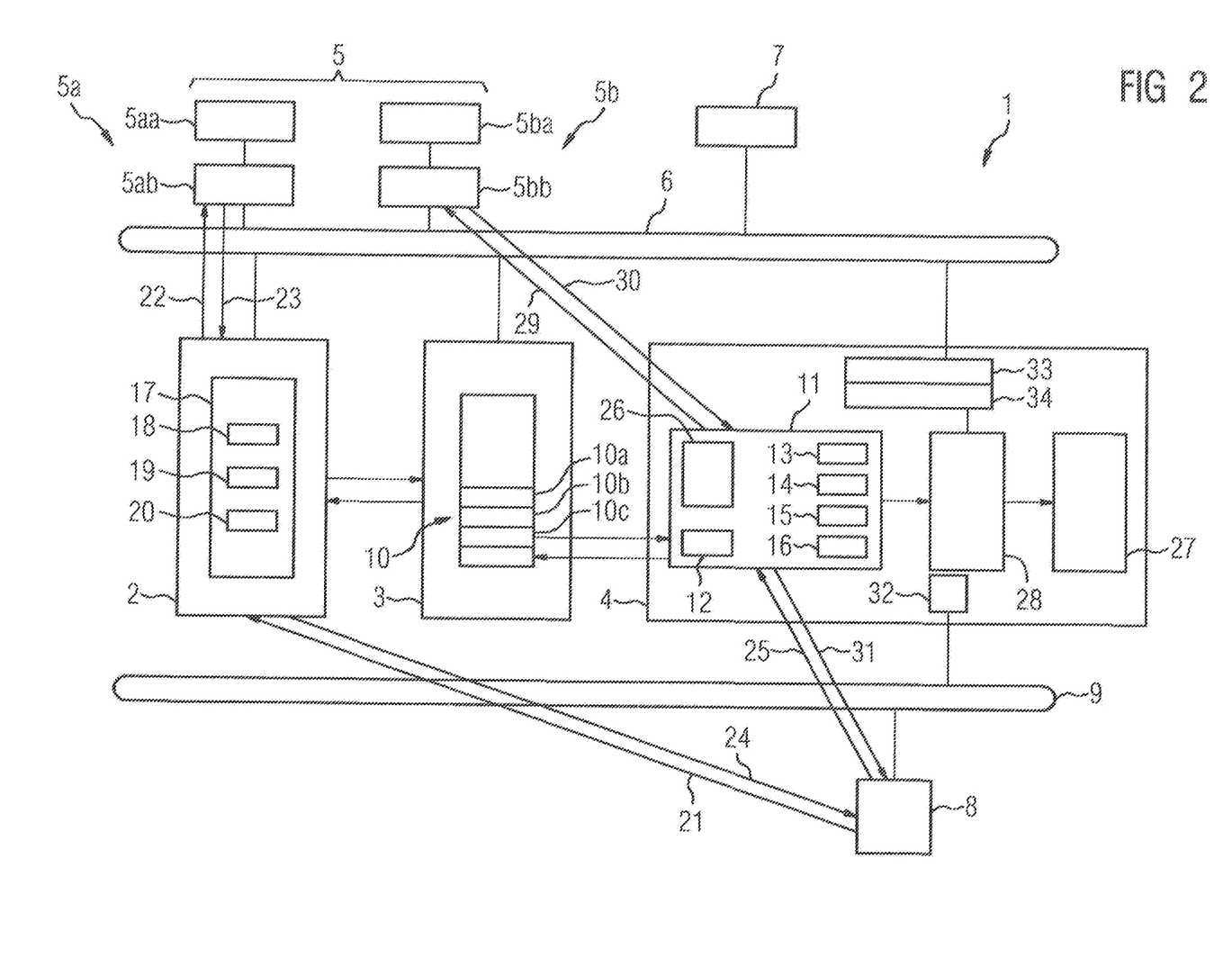
FIG. 2 shows a schematic sketch of a control system according to the invention.

FIG. 2 shows an inventive control system 1 of a technical installation. The control system 1 comprises an engineering component or an engineering station 2, a process data archive or a process historian 3, a server of an operator system or an operator system server 4, and a certification authority 5. The engineering station 2, the process historian 3, the operator system server 4 and the certification authority 5 are connected to one another via a terminal bus 6.

A user or client 7 is connected to the previously mentioned four components via the terminal bus 6. The terminal bus 6 can be formed as an industrial Ethernet, for example, without being restricted to this particular configuration. The certification authority 5 has a first hierarchy 5a and a second hierarchy 5b. The first hierarchy 5a is configured to issue project-related device certificates for devices 8. To this end, the first hierarchy 5a of the certification authority 5 comprises a root certification authority 5aa and an issuing certification authority 5ab. In the same way, the second hierarchy 5b of the certification authority 5 comprises a root certification authority 5ba (root CA) and an issuing certification authority 5bb (issuing CA).

The root certification authorities 5aa, 5ba of the two hierarchies 5a, 5b are independent of one another, here. The first hierarchy 5a of the certification authority 5 is configured to issue project-dependent device certificates. The second hierarchy 5b of the certification authority 5 is configured to issue project-dependent operational certificates.

The certification authority 5 is configured to grant project-dependent device certificates and operational certificates, depending on the engineering project in the context of which a request relating to a certificate is made to the certification authority 5.

A device 8 is connected to the operator system server 4 via an installation bus 9. Here, the connected device 8 may alternatively also be an application, in particular a web application. In the context of the invention, any given number of devices and/or applications may be connected to the operator system server 4. The installation bus 9 may be formed, for example, as an industrial Ethernet, without being restricted to this particular configured. In turn, the device 8 may be connected to any number of subsystems (not shown).

A software inventory or an inventory 10 is integrated in the process historian 3 or process data archive. The software inventory 10 comprises a plurality of subinventories 10a, 10b, 10c. Integrated in the operator system server 4 is a first local registration authority 11. The local registration authority 11 of the operator system server 4 has, as subservices, a manager service 12, a status service 13, a notifier service 14, a distribution service 15 and a registration service 16, the functionality and tasks of which are explained in the following. Furthermore, the local registration authority 11 comprises a local data store 26. Alternatively or additionally, the local registration authority 11 may be integrated in the engineering system 2.

In the embodiment of the control system 1 shown in FIG. 1, the variant of a separate, second local registration authority 17 is shown. The second local registration authority 17 is integrated in the engineering system 2. This comprises, as subservices, a registration service 18, a configuration service 19 and a distribution service 20, the functionality and tasks of which are likewise explained subsequently.

All devices 8 or applications integrated in the technical installation must authenticate themselves against the local registration authority 17 of the engineering system 2 upon commissioning of the technical installation, in order to be registered as trustworthy communication partners. To this end, in the present case, the device 8 sends a request 21 for the compilation of a device certificate, what is known as a certificate signing request (CSR). This contains a unique project ID of the engineering project, in the context of which the request 21 is made.

The request 21 of the device 8 is forwarded to the first hierarchy 5a of the certification authority 5 via the registration service 18 of the local registration authority 17 of the engineering system 2. In the process, the issuing certification authority 5ab of the first hierarchy 5a requests a corresponding certificate 5aa at the root certification authority 5ab.

In addition to the actual authentication of the device 8, it is additionally established which communications protocols or applications are supported by the device 8. In this context, with the aid of information from the inventory 10 of the process historian 3, the local registration authority 17 of the engineering system 2 first checks which devices/applications 5 are registered as trustworthy communication partners and which certificates are due to the device 8 in the context of an engineering project. This presupposes that it is stored in the inventory 10 which protocols and applications are actively supported by the devices/applications 8 integrated in the technical installation. As a consequence of this checking, the device 8 is only provided with the certificates that it requires to use a particular protocol, for example HTTPS, secure syslog or OPC UA, or a particular application.

Subsequently, the local registration authority 17 of the engineering system 2 additionally checks whether the device 8 actually even requires the certificates supported by it in principle. To this end, the configuration service 19 of the local registration authority 17 of the engineering system 2 establishes a network configuration of the technical installation, including the communication relationships between individual components of the technical installation, and checks whether the device 8 actively even uses the communication relationships and therefore actually even requires the corresponding certificates.

Only in the event of a successful check does the local registration authority 17 of the engineering system 2, on behalf of the device 8, obtain the corresponding project-dependent device certificate via a corresponding certification signing request 22 and an allocation 23 by the first hierarchy 5a of the certification authority 5. The project-dependent device certificate is finally transmitted from the distribution service 20 of the local registration authority 17 of the engineering system 2 via an allocation 24 to the device 8. In addition, the project-dependent device certificate is stored in a subinventory 10a, 10b, 10c of the software inventory 10 allocated to the engineering project. An allocation of the device certificate therefore only occurs when necessary and depending on the engineering project, in the context of which the authentication of the device 8 against the control system 1 is occurring.

It is often the case that the engineering system 2 is not or not constantly available at runtime of the technical installation. To this end, the first local registration authority 11 is integrated in the operator system server 4. The functionality thereof is similar to that of the second, previously explained registration authority 17 in the engineering system 2. The method for authenticating devices/applications 8 or for granting certificates thereto at runtime of the technical installation substantially differs from the previously explained authentication on commissioning of the technical installation because it is initiated on an event-driven basis. One such event, for example, is represented by a device replacement during runtime, without being restricted to this.

The manager service 12 of the local registration authority 11 loads the information required to check the certificate signing request 25 made by the replaced device 8 from the corresponding subinventory 10a, 10b, 10c of the software inventory 10. In order to be able to select the correct subinventory 10a, 10b, 10c, the request 25 contains a unique project ID of the engineering project, in the context of which the request 25 is made. The data stored in the subinventory 10a, 10b, 10c is loaded into the data store 26 of the local registration authority 11.

Subsequently, the manager service 12 first establishes which devices/applications 8 are registered as trustworthy communication partners and which certificates are due to the device 8. Additionally, the manager service 12 checks whether the device 8 possesses a corresponding project-related device certificate in the context of the engineering project, in the context of which the request 25 was made.

Similarly to the method on commissioning of the technical installation, this check results in the replacement device 8 only being permitted to be provided with the operational certificates which it requires in order to use a particular protocol, for example HTTPS, secure syslog or OPC UA or a particular application in the context of a particular engineering project and which are permitted to be allocated to it.

Additionally, the manager service 12 checks whether the replacement device 8 actually even requires the operational certificates supported by it in principle. To this end, the manager service 12 establishes a current network configuration of the technical installation, including the communication relationships between individual components of the technical installation, and checks whether the replacement device 8 actively even uses the communication relationships and therefore actually even requires the corresponding operational certificates.

The information regarding the communication relationships or the network configuration of the technical installation is obtained by the manager service 12 from a configuration process 27 of a runtime environment 28 of the operator system server 4. The information is then stored in the respective project-related subinventory 10a, 10b, 10c of the software inventory 10 of the process historian 3 by the manager service 12. In addition to the previously mentioned information, the manager service 12 may also store information relating to relevant clients 7 in the inventory 10.

Only in the event of a successful check does the local registration authority 11 of the operator system server 4, on behalf of the replacement device 8, obtain the corresponding operational certificate via a corresponding certification signing request 29 and a corresponding allocation 30 by the second hierarchy 5b of the certification authority 5. The operational certificate is finally transmitted from the distribution service 15 of the first local registration authority 11 of the operator system server 4 via an allocation 31 to the replacement device 8. In this context, the distribution service 15 uses drivers 32 of the runtime environment 28 of the operator system server 4.

An allocation of the operational certificates therefore only occurs when necessary, and in the event of a valid authorization, which considerably reduces the communication volume caused by the certificate administration and prevents devices 8 and/or applications or particular users from obtaining undesired access to the control system 1 or to parts of the control system 1 and the industrial installation associated therewith. At the same time, it is possible to replace a device 8 at runtime of the industrial installation, i.e., the installation does not have to be stopped for the device replacement.

A transmission of authentication data or certificates to the client or plurality of clients 7 may occur via a data source 34 integrated into a visualization service 33 of the operator system server 4.

All operational certificates that the first local registration authority 11 has obtained on behalf of the device 8 are stored in the data store 26. The status service 13 of the first local registration authority 11 monitors the expiration date of the certificates in particular. If the status service 13 ascertains that a certificate will soon expire, then the first local registration authority 11 requests a replacement certificate at the second hierarchy 5b of the certificate authority 5. Here, the current configuration of the installation network is particularly taken into account.

The notifier service 14 of the first local registration authority 11 in particular reviews whether a validity date of the operational certificates situated in the software inventory 10 will soon expire. In such a case, the first local registration authority 11 uses the runtime environment 28 of the operator system server 4 to generate a corresponding diagnostics message (alarm), so that operators of the control system 1 or maintenance personnel are informed via a corresponding output in what are known as alarm controls of the client 7, in order to subsequently perform corresponding actions. The notifier service 14 also responds to further configuration changes in the technical installation that are relevant to certificate administration, by generating corresponding messages to the operator.

A further subservice of the first local registration authority 11 is the status service 13. The status service 13 establishes a current status of the operational certificates used at runtime of the control system 1. An item of status information may be the number and type of the certificates, for example, which are used by the devices/applications 8. The status service 13 may also detect whether operational certificates are still being allotted by the distribution service 15 at present, or whether certificates still have to be allotted in future. The status service 13 may also log possibly occurring errors during the authentication or granting of certificates.

With the features previously described based on the figures, what the disclosed embodiments of the invention achieve is that an undesired or unauthorized validation of a device certificate issued in the context of a (correct) engineering project P1, P2 is no longer possible in a different (incorrect) engineering project P1, P2. This is because the parameters necessary for the certificate administration (in particular a certificate chain including the public keys (PKI) of the certification authorities 5 involved) are only available in the context of the "correct" engineering project P1, P2 (in the subinventory 10a, 10b, 10c associated therewith).

Figure 3:
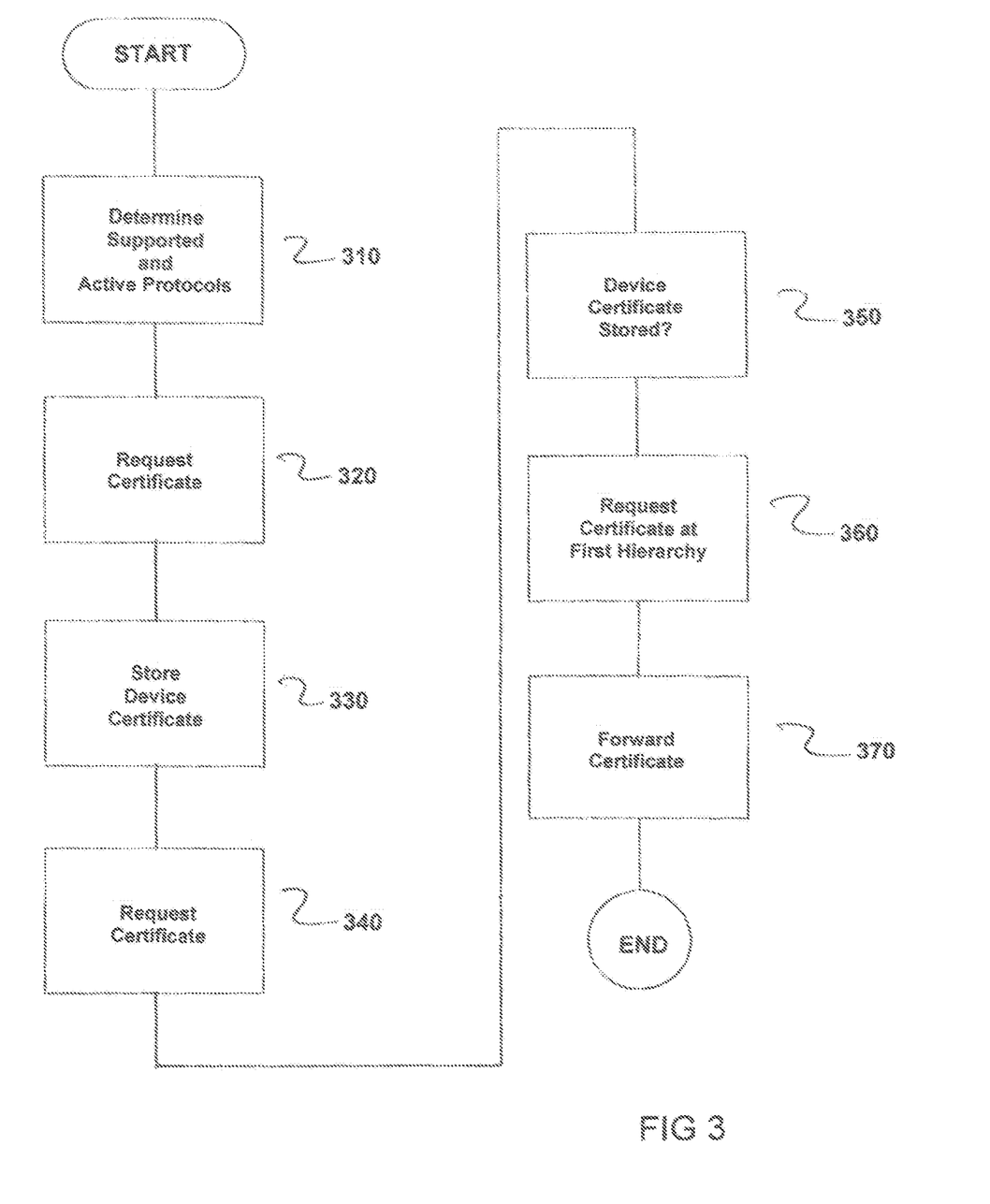
FIG. 3 is a flowchart of the method in accordance with the invention.

FIG. 3 is a flowchart of the method for project-related authentication of a device 8 in a control system 1 for a technical installation in the context of an engineering project in which the control system 1 includes at least one local registration authority 11, at least one software inventory 10 and one certification authority 5 formed on a project-related basis with a first hierarchy and a second hierarchy, where the first hierarchy issue project-related device certificates for devices 8, and the second hierarchy issue project-related operational certificates for devices 8.

The method comprises establishing information via the at least one local registration authority 11 to determine which communication protocols are supported by the device 8 and are active during an authentication of the device 8 within the control system 1, as indicated in step 310.

Next, the project-related device certificate are requested at the first hierarchy of the certification authority 5 via the local registration authority 11 in an event the local registration authority 11 verifies that a particular project-related device certificate is supported by the device 8 and is active, as indicated in step 320.

Next, the project-related device certificate is stored in a sub-inventory of the at least software inventory 10 of the control system 1 assigned to the engineering project, as indicated in step 330.

Next, a project-related operational certificate is requested via a device 8 at the at least one local registration authority 11, as indicated in step 340.

Next, a check is performed, via the at least one local registration authority 11, to determine whether a corresponding project-related device certificate is stored in a sub-inventory of the software inventory 10 of the control system 1 assigned to the engineering project for the device 8 issuing the request in the context of the engineering project in which the device 8 is issuing the request, as indicated in step 350.

Next, a project-related operational certificate is requested at the first hierarchy of the certification authority 5 via the at least one local registration authority 11 in the event the at least one local registration authority 11 verifies that a particular project-related operational certificate is supported by the device 8 and is active, as indicated in step 360.

Next, the project-related operational certificate is forwarded to the device 8, as indicated in step 370.

Although the invention has been illustrated and described in greater detail with the preferred exemplary embodiment, the invention is not restricted by the examples disclosed and other variations can be derived therefrom by the person skilled in the art without departing from the protective scope of the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for project-related authentication of a device in a control system for a technical installation in the context of an engineering project, the control system including an operator system server having at least one first local registration authority, a process data archive including at least one software inventory and one certification authority formed on a project-related basis with a first hierarchy and a second hierarchy, the first hierarchy issuing project-related device certificates for devices, and the second hierarchy issuing project-related operational certificates for devices, the method comprising:
   a) establishing information via one of the at least one first local registration authority and at least one second local registration authority of an engineering station to determine which communication protocols are supported by the device and are active during an authentication of the device within the control system;
   b) requesting a project-related device certificate at the first hierarchy of the certification authority via one of the at least one first local registration authority and the at least one second local registration authority of the engineering station in an event one of the at least one first local registration authority the at least one second local registration authority of the engineering station verifies that a particular project-related device certificate is supported by the device and is active;
   c) storing the project-related device certificate in a sub-inventory of the at least software inventory of the control system assigned to the engineering project;
   d) requesting a project-related operational certificate via a device at one of the at least one first local registration authority and the at least one second local registration authority of the engineering station;
   e) checking, via one of the at least one first local registration authority and the at least one second local registration authority of the engineering station, whether a corresponding project-related device certificate is stored in a sub-inventory of the software inventory of the control system assigned to the engineering project for the device issuing the request in the context of the engineering project in which the device is issuing the request;
   f) requesting a project-related operational certificate at the first hierarchy of the certification authority via one of the at least one first local registration authority and the at least one second local registration authority of the engineering station in the event one of the at least one first local registration authority and the at least one second local registration authority of the engineering station verifies that a particular project-related operational certificate is supported by the device and is active; and
   g) forwarding the project-related operational certificate from the first hierarchy of the certification authority to the device.

2. A control system for a technical installation, the control system including:
   a processor;
   memory;
   an operator system server including at least one first local registration authority;
   a process data archive including at least one software inventory; and
   a certification authority formed on a project-related basis with a first hierarchy and a second hierarchy, the first hierarchy issuing project-related device certificates for devices and the second hierarchy issuing project-related operational certificates for devices;
   wherein the processor is configured to:
   a) establish information via one of the at least one first local registration authority and at least one second local registration authority of an engineering station to determine which communication protocols are supported by the device and are active during an authentication of the device within the control system;
   b) request a project-related device certificate at the first hierarchy of the certification authority via one of the at least one first local registration authority and the at least one second local registration authority of the engineering station in an event one of the at least one first local registration authority and the at least one second local registration authority of the engineering station verifies that a particular project-related device certificate is supported by the device and is active;
   c) store the project-related device certificate in a sub-inventory of the at least software inventory of the control system assigned to the engineering project;
   d) request a project-related operational certificate via a device at one of the at least one first local registration authority and the at least one second local registration authority of the engineering station;
   e) check, via one of the at least one first local registration authority and the at least one second local registration authority of the engineering station, whether a corresponding project-related device certificate is stored in a sub-inventory of the software inventory of the control system assigned to the engineering project for the device issuing the request in the context of the engineering project in which the device is issuing the request;
   f) request a project-related operational certificate at the first hierarchy of the certification authority via one of the at least one first local registration authority and the at least one second local registration authority of the engineering station in the event one of the at least one first local registration authority and the at least one second local registration authority of the engineering station verifies that a particular project-related operational certificate is supported by the device and is active; and g) forward the project-related operational certificate from the first hierarchy of the certification authority to the device.

3. The control system as claimed in claim 2, wherein the first and second hierarchies of the certification authority each comprise a root certification authority and an issuing certification authority.

4. The control system as claimed in claim 2, wherein the control system operates a technical installation.

* * * * *